United States Patent [19]

Nishi et al.

[11] Patent Number: 5,250,783
[45] Date of Patent: Oct. 5, 1993

[54] METHOD OF LASER-WELDING METAL SHEETS HAVING DIFFERENT THICKNESS

[75] Inventors: Eiji Nishi; Taminori Yanagisawa; Toshiyuki Takasago; Kouichi Arima, all of Toyota, Japan

[73] Assignee: Toyota Jidosha Kabushiki Kaisha, Toyota, Japan

[21] Appl. No.: 939,467

[22] Filed: Sep. 2, 1992

[30] Foreign Application Priority Data

Sep. 5, 1991 [JP] Japan .................. 3-252817

[51] Int. Cl.⁵ ............................. B23K 26/00
[52] U.S. Cl. ................................. 219/121.64
[58] Field of Search ............... 219/121.63, 121.64

[56] References Cited

U.S. PATENT DOCUMENTS

| | | | |
|---|---|---|---|
| 4,854,905 | 8/1989 | Shibuya et al. | 219/121.64 X |
| 4,868,365 | 9/1989 | Farone et al. | 219/121.64 |
| 4,872,940 | 10/1989 | Strum et al. | 219/121.63 X |
| 4,935,029 | 6/1990 | Matsutani et al. | 219/121.63 X |

FOREIGN PATENT DOCUMENTS

| | | |
|---|---|---|
| 8716668 | 3/1988 | Fed. Rep. of Germany . |
| 62-144888 | 6/1987 | Japan . |
| 1205893 | 8/1989 | Japan . |

OTHER PUBLICATIONS

Laser Beam Welding Method, Pat. Abs. of Japan, vol. 11, No. 372, December 4, 1987
Laser Beam Welding Method, Pat. Abs. of Japan, vol. 12, No. 269, July 27, 1988

Primary Examiner—C. L. Albritton
Attorney, Agent, or Firm—Cushman, Darby & Cushman

[57] ABSTRACT

Metal sheets having different thicknesses are abutted to define an abutment line and then are laser-welded. During laser welding, the laser beam is directed to a line (a weld line) which is apart from the abutment line on a thicker sheet side. The distance between the abutment line and the weld line is preferably in the range of 0.1 mm to 0.4 mm. Preferably, the laser beam weaves from side to side with respect to the weld line. As a result, a sharp edge is removed from the thicker sheet and a smooth transient surface is formed on the weld bead. The resulting one-piece sheet can be used as a press material without any pre-pressing processing, such as grinding.

15 Claims, 9 Drawing Sheets

METHOD OF LASER-WELDING METAL SHEETS HAVING DIFFERENT THICKNESS

BACKGROUND OF THE INVENTION

1. Field of the Invention

The present invention relates to a method of laser-welding metal sheets together, each of different thicknesses, resulting in a welded portion lacking a sharp edge.

2. Description of the Prior Art

To decrease weight and increase the rigidity of vehicles and to improve yield ratios of materials, one-piece materials are formed by laser-welding metal sheets having different thicknesses along abutting edges. The resulting assembly may be used as a press material for outer or inner body panels of vehicles.

Japanese Patent Publication SHO 63-168286 discloses laser-welding two metal sheets having different thicknesses together by linearly moving the laser beam along the weld line. In the laser welding, the laser beam axis is inclined from the vertical direction so that the laser beam is directed toward the thicker sheet. However, as illustrated in FIG. 16, with the conventional welding method, a sharp edge 2 remains at the corner of the thicker plate at the welded portion 1. To protect the press roll from galling while stamping such a laser-welded press material, the sharp edge must be removed by, for example, grinding after the sheets are welded. However, such grinding requires an additional manufacturing step and increases the cost to an unacceptably high level. Furthermore, in some cases, the strength of the panel is decreased as a result of over-grinding.

SUMMARY OF THE INVENTION

An object of the invention is to provide a method of laser-welding two metal sheets having different thicknesses together without leaving a sharp edge at the welded portion.

This object is achieved by providing a method of laser-welding metal sheets of different thicknesses together, in accordance with the present invention, which includes the steps of: clamping the metal sheets of different thicknesses so that the metal sheets abut each other at end surfaces thereof to define an abutment line; generating a laser beam with a laser welding apparatus; directing the laser beam toward a line parallel to the abutment line and apart from the abutment line on the thicker sheet side, the line apart from the abutment line defining a weld line; and during the step of directing, moving the laser beam along the weld line, thereby to from a weld bead which laser-welds the metal sheets together.

As a result of offsetting the weld line from the abutment line, an abutment portion of the thicker sheet is heated more than an abutment portion of the thinner sheet. As a result, the thicker sheet is sufficiently melted to form a weld bead over the entire thickness thereof and no sharp edge remains at the abutment end of the thicker sheet. Further, since the thinner sheet is heated less than the thicker sheet, the abutment portion of the thinner sheet is unlikely to be melted-down.

BRIEF DESCRIPTION OF THE DRAWINGS

The above and other objects, features, and advantages of the present invention will become more apparent and will be more readily appreciated from the following detailed description of the preferred embodiments of the invention taken in conjunction with the accompanying drawings, in which.

DETAILED DESCRIPTION OF THE PREFERRED EMBODIMENT

Figure 1:
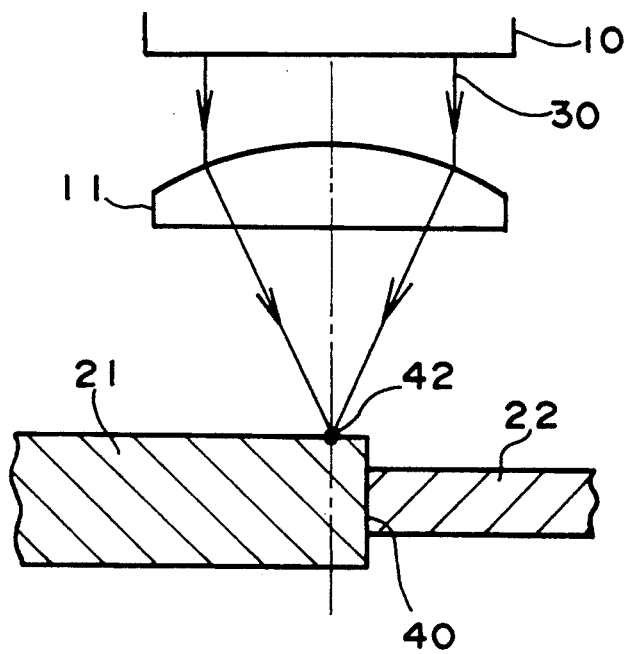
FIG. 1 is an enlarged schematic cross-sectional view of a laser beam and metal sheets abutted to each other with the thickness centers aligned with each other in accordance with a first embodiment of the present invention.
Figure 2:
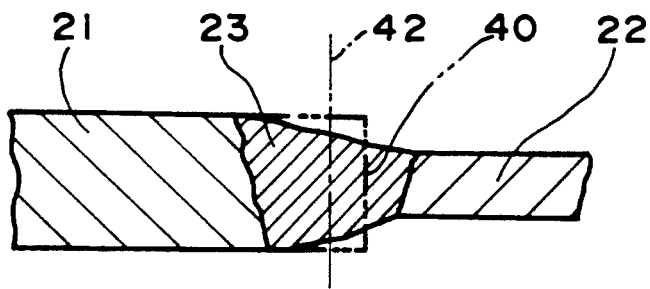
FIG. 2 is a cross-sectional view of the welded portion of the metal sheets of FIG. 1.

As illustrated in FIGS. 1 and 2, a laser welding apparatus for executing a laser welding method in accordance with a first embodiment of the invention includes a laser torch 10 for emitting a laser beam 30, and a condenser lens 11 for focusing the laser beam 30. The laser torch 10 is carried and moved by a robot.

Using the laser welding apparatus, the method of laser-welding metal sheets 21 and 22 having different thicknesses to form a press material for one piece stamping in accordance with the first embodiment of the invention is carried out. The laser-welded materials are pressed after laser welding and used as outer and/or inner body panels for automobiles. The metal sheets for panels for automobiles have a thickness in the range of 0.7 to 2.3 mm. It is sufficient for automobile panels to provide a method capable of laser-welding a first metal sheet to a second metal sheet having a thickness greater than half the thickness of the first metal sheet and less than twice the thickness of the first metal sheet.

The laser welding method is executed as follows: First, metal sheets 21 and 22 (for example, steel sheets or galvanized steel sheets), each of different thicknesses, are press-cut to necessary dimensions and prepared. Then, the metal sheets 21 and 22 are clamped with sheet clamping devices (not shown) so that the metal sheets 21 and 22 abut each other at end surfaces thereof to define an abutment line 40. Preferably, the thickness centers of the metal sheets 21 and 22 are aligned, so that the step between the surfaces of the sheets 21 and 22 is minimized.

Then, a laser beam 30 is generated with the laser welding apparatus. The axis of laser beam 30 is directed perpendicularly toward the metal sheet's surface, upon a line parallel to the abutment line 40 and apart from the abutment line 40 on the thicker sheet side. The line apart from the abutment line 40 defines a weld line 42.

During the directing of the laser beam 30, the laser beam 30 is moved along the weld line 42 by moving the laser torch 10 along the weld line 42, to form a weld bead 23 via which the two sheets are welded to each other. In the first embodiment, the laser beam 30 is moved linearly along the weld line 42.

The reason why the weld line 42 is apart from the abutment line 40 is that the thicker sheet 21 requires more heating by the laser beam 30 than the thinner sheet 22 so that a weld bead 23 is formed over the entire thickness of the thicker sheet 21 and the initial sharp edge is melted down and removed, without being accompanied by the melting-down of the abutment portion of the thinner sheet 22.

More particularly, in the conventional laser welding, the laser beam was directed to the abutment line of the two sheets and was moved linearly along the abutment line. In the conventional laser welding, the amount of irradiation of the laser beam was limited so as not to melt-down the thinner sheet, with the result that a sharp edge remained at the corner of the thicker sheet. In contrast, in the present invention, since the weld line 42 is offset on the thicker sheet side, the irradiation amount of the laser beam which the thicker sheet 21 receives increases and the amount of laser beam which thinner sheet 22 receives decreases, so that the abutment portion of the thicker sheet 21 is sufficiently melted and the abutment portion of the thinner sheet 22 is prevented from being melted-down.

Figure 6:
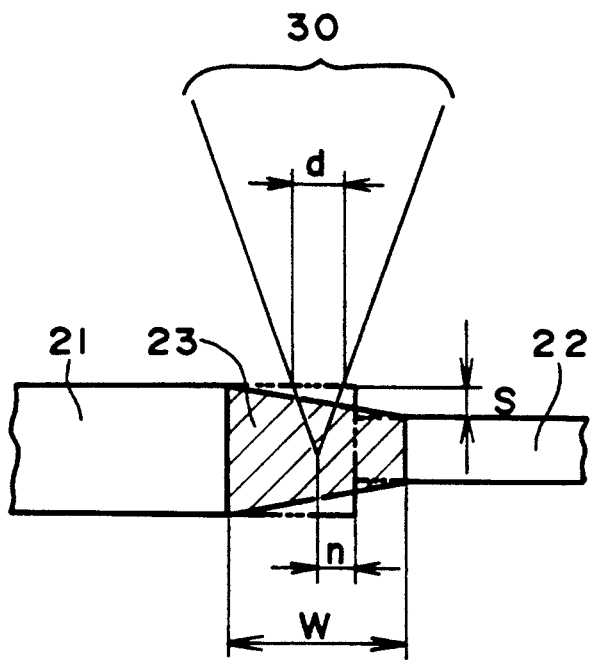
FIG. 6 is a schematic view of the laser beam and the sheets of FIG. 1 with references denoted therein.

The optimum distance between the weld line 42 and the abutment line 40 can be estimated by the following equation with reference to FIG. 6.

$$c\,t\,(1+n) : t\,(1-n) = (d/2+n) : (d/2-n)$$

where,
t is a thickness of the thinner sheet,
c t is a thickness of the thicker sheet,
n is a distance between the weld line and the abutment line, and
d is a diameter of a heating spot of the laser beam.

In the above equation, the width of the weld bead is presumed to be 2 mm. The term of c t (1+n) corresponds to a volume of the portion of the thicker sheet to be heated, and the term of t (1−n) corresponds to a volume of the portion of the thinner sheet to be heated. Further, the term of (d/2+n) corresponds to a width of the thicker sheet which receives the laser beam, and the term of (d/2−n) corresponds to a width of the thinner sheet which receives the laser beam. For example, in the typical case of c=2, t=1 mm, and d=0.5 mm, n is calculated to be 0.106 mm.

Figure 5:
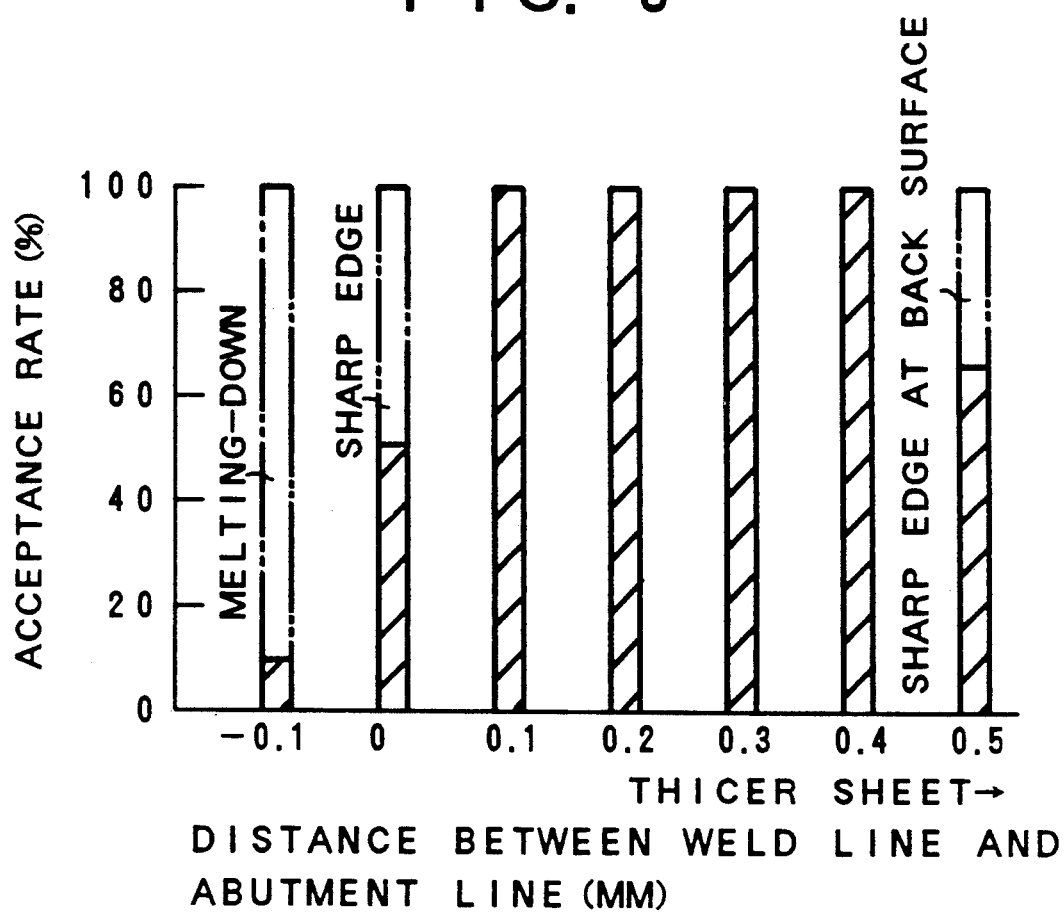
FIG. 5 is a graph illustrating a relationship between an acceptance rate and a distance between an abutment line and a weld line.

The optimum distance between the weld line 42 and the abutment line 40 was estimated in tests. In the tests, the thickness of the thicker sheet was 1.4 mm, and the thickness of the thinner sheet was 0.7 mm. Changing the distance variously, the weld beads were observed. The test results are shown in FIG. 5 in which a hatched portion shows an acceptable portion and a blank portion shows a non-acceptable portion. The case of n=−0.1 mm means that the axis of the laser beam was offset from the thicker sheet side by 0.1 mm. In that case, the abutment portion of the thinner sheet was likely to be melted-down. The case of n=0 mm means that the laser beam was directed to the abutment line. In that case, a sharp edge was likely to remain at the corner of the thicker sheet. In the cases of n=0.1 mm to 0.4 mm, all welded assemblies were acceptable. In the case of n=0.5 mm, a sharp edge was likely to remain at a corner of the back surface of the thicker sheet. From these test results, the distance between the weld line 42 and the abutment line 40 should be in the range of 0.1 mm to 0.4 mm. The above-discussed theoretical optimum distance of 0.106 mm is in this range.

The laser welding method was executed using the thicker sheet 21 having the thickness of 1.4 mm and the thinner sheet 22 having the thickness of 0.7 mm and offsetting the weld line 42 from the abutment line 40 by 0.2 mm. The result is shown in FIG. 2. From FIG. 2, it is seen that a smooth weld bead surface extending from the surface of one sheet to the surface of the other sheet was obtained, without producing any sharp edge at the corner of the thicker sheet nor melt-down of the thinner sheet.

The sheets of different thicknesses constructed through such a laser welding process are then pressed to form outer or inner body panels of vehicles. Since the sheets have no sharp edge at the welded portions, the press roll does not cause a galling during press. As a result, grinding before pressing, which was thought to be indispensable in the past, can be omitted. The omission of grinding decreases the manufacturing cost of the assembly.

Figure 3:
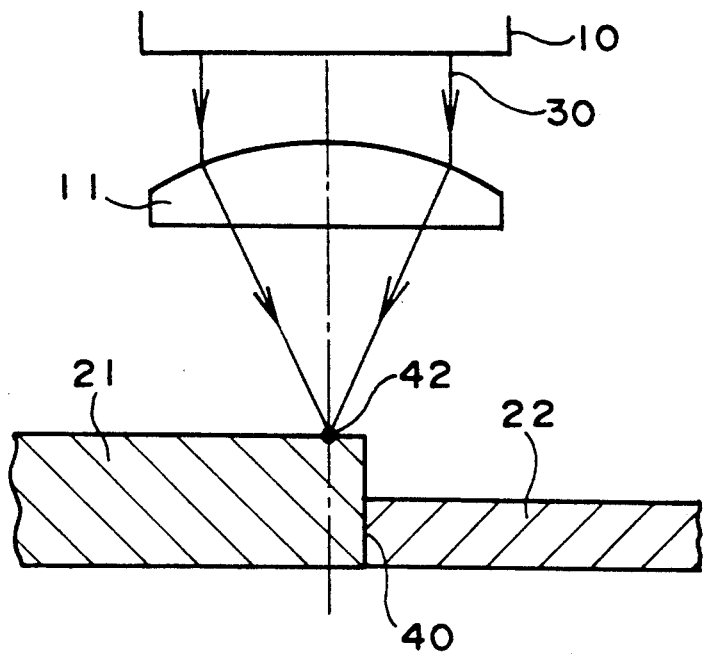
FIG. 3 is an enlarged schematic cross-sectional view of a laser beam and metal sheets abutted to each other with the back surfaces placed in the same level in accordance with a second embodiment of the present invention.
Figure 4:
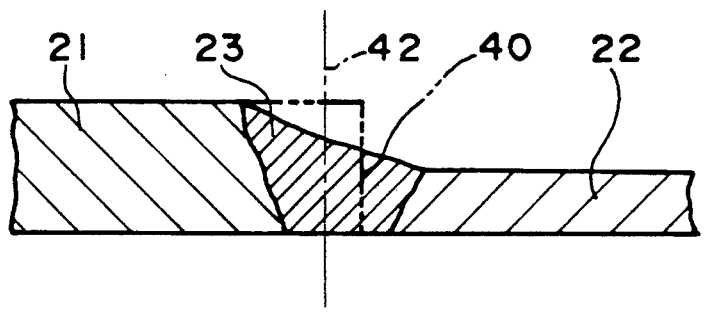
FIG. 4 is a cross-sectional view of the welded portion of the metal sheets of FIG. 3.

FIGS. 3 and 4 illustrate a laser weld apparatus and a welded portion of sheets having different thicknesses in accordance with a second embodiment of the invention. The second embodiment differs from the first embodiment only in that, in the second embodiment, a back surface of a thicker sheet and a back surface of a thinner sheet are placed in the same level during laser welding, while in the first embodiment, the thickness center of the thicker sheet and the thickness center of the thinner sheet were placed in the same level. Since the remaining portions of the second embodiment are the same as those of the first embodiment, the same portions of the second embodiment are denoted with the same reference numerals of the first embodiment, thereby to omit explanation of the second embodiment. With respect to the distance between the weld line 42 and the abutment line 40, the same relationship as that of the first embodiment holds in the second embodiment.

FIGS. 7 to 15 illustrate a third embodiment of the invention. In the third embodiment, in addition to offsetting a weld line from an abutment line, a laser beam is weaved. For enabling easy comparison between the first embodiment and the third embodiment, the same portions of the third embodiment as those of the first embodiment are denoted with the same reference numerals as those of the first embodiment.

Figure 7:
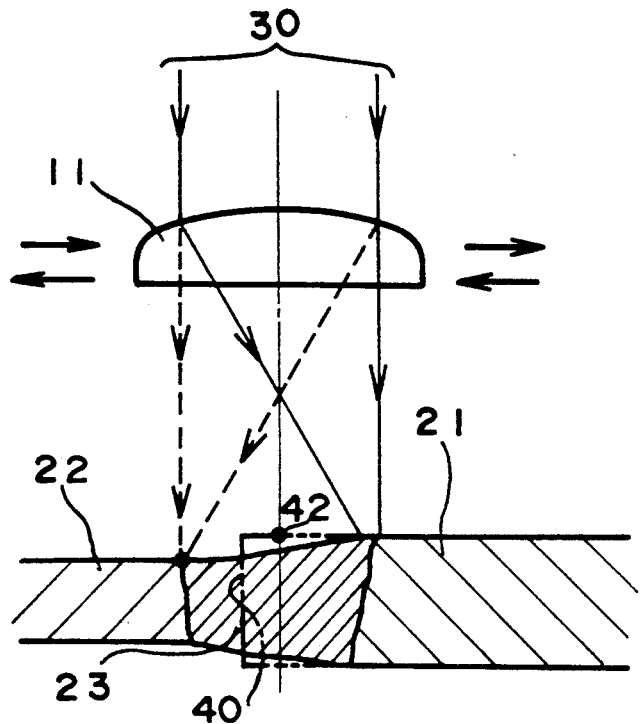
FIG. 7 is an enlarged schematic cross-sectional view of a weaved laser beam and metal sheets abutted to each other with the thickness centers aligned with each other in accordance with a third embodiment of the present invention.
Figure 8:
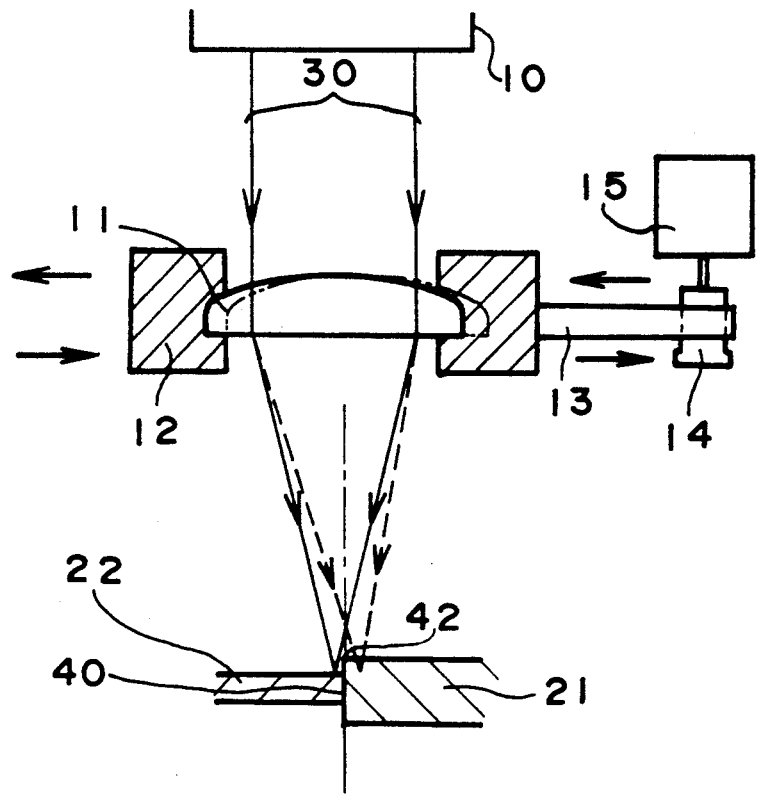
FIG. 8 is a cross-sectional view of a portion of a laser welding apparatus for executing a laser welding method in accordance with the third embodiment of the invention.

As shown in FIGS. 7 and 8, the laser welding apparatus for executing the laser welding method in accordance with the third embodiment of the invention includes a laser torch 10, a condenser lens 11, a lens mount 12 for supporting the condenser lens 11, and a drive mechanism for reciprocally driving the lens mount 12 and the condenser lens 11. The laser torch 10 is moved linearly along the weld line 42 by a robot. The weld line 42 is apart from an abutment line 40 at which a thicker sheet 21 and a thinner sheet 22 are abutted to each other. A distance between the weld line 42 and the abutment line 40 is set so as to be in the range of 0.1 mm to 0.4 mm as was discussed in the first embodiment. The assembly of the condenser lens 11 and the lens mount 12 is reciprocal in a direction perpendicular to the weld line 42. The drive mechanism is connected to the lens mount 12 and reciprocally drives the lens mount 12 and the condenser lens 11 perpendicularly to the weld line 42. As a result, the laser beam 30 weaves from side to side with respect to the weld line 42.

The drive mechanism includes, for example, an electric motor 15 of the variable rotational speed-type, an eccentric cam 14 having a cam surface eccentric with respect to a rotational axis of the cam and connected to an output shaft of the motor 15 to thereby generate a reciprocal motion, and a connecting member 13 for transmitting the reciprocal motion of the cam surface of the eccentric cam 14 to the condenser lens mount 12. The eccentric cam 14 is rotatably fitted in a circular hole formed in one end portion of the connecting member 13 and an opposite end portion of the connecting member 13 is pivotably connected to the lens mount 12.

Figure 12:
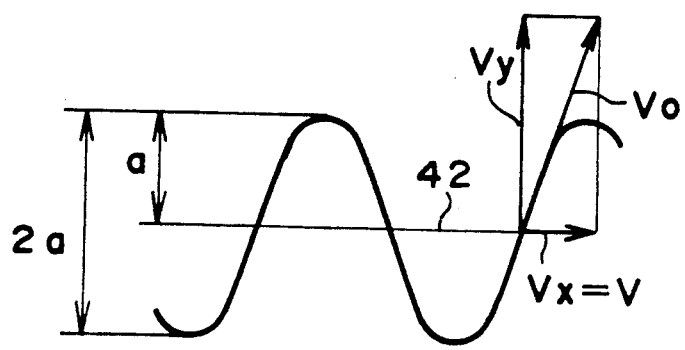
FIG. 12 is a schematic vies of a sinusoidal wave which the weaving laser beam traces.

With the drive mechanism shown in FIG. 8, the weaving laser beam traces a sinusoidal wave as shown in FIG. 12. The amplitude of weaving of the laser beam can be changed by changing the difference between the largest radius and the smallest radius of the cam surface of the eccentric cam 14 and the frequency of weaving of the laser beam can be changed by changing the rotational speed of the motor 15.

Using the laser welding apparatus, the method of laser-welding metal sheets 21 and 22 having different thicknesses to form a press material for one piece stamping in accordance with the third embodiment of the invention is carried out. The laser welding method is executed as follows:

First, metal sheets 21 and 22, each of different thicknesses, are press-cut to necessary dimensions and prepared. Then, the metal sheets 21 and 22 are clamped with sheet clamping devices so that the metal sheets 21 and 22 abut each other to define the abutment line 40. Preferably, the thickness centers of the metal sheets 21 and 22 are aligned, so that the step between the surfaces of the sheets 21 and 22 is minimized.

Then, the metal sheets 21 and 22 are laser-welded together, weaving the laser beam 30 from side to side with respect to the weld line 42. More particularly, during laser welding, the laser torch 10 is moved linearly along the weld line 42 and the condenser lens 11 is reciprocated in a direction perpendicular to the weld line 42. Weaving the laser beam 30 widens the weld bead 23 so that the surface of one steel sheet 21 gradually and smoothly changes to the surface of the other steel sheet 22 via the surface of the weld bead 23. During laser welding, the thicker sheet should be completely melted over the entire thickness thereof so that no edge of the thicker plate remains at the welded portion.

Figure 9:
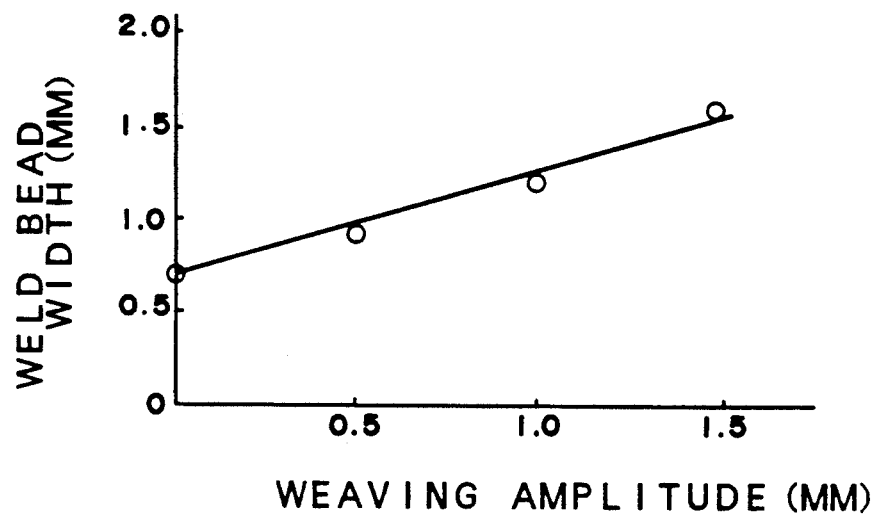
FIG. 9 is a graphical representation of a weld bead width versus laser beam weaving amplitude characteristic.

To obtain a weld bead having smoothly continuous bead surfaces and no sharp edge at the weld line, it is preferable to satisfy the following laser welding conditions in the third embodiment of the invention:

First, a width W (see FIG. 6) of the weld bead 23 is selected to be equal to or greater than 1.0 mm. If the weld beam is not weaved, the width of the weld bead will be 0.5 to 0.7 mm. Due to the weaving of the laser beam 30, the width of the weld bead 23 is widened as shown in FIG. 9. If the width of the weld bead is less than 1.0 mm, the gradient (S / W, where S is the offset between the surfaces of the metal sheets) of the surface of the weld bead is too steep to generate an edged corner at the ends of the surfaces of the thicker sheet.

Figure 10:
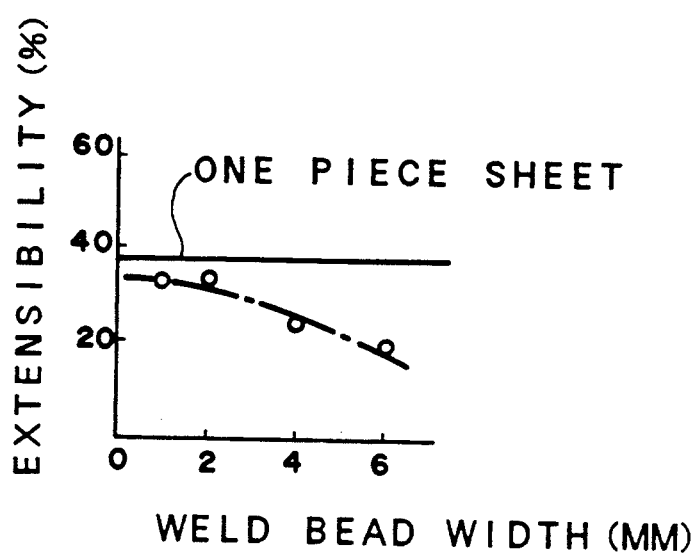
FIG. 10 is a graphical representation of an extensibility versus weld bead width characteristic.

Second, the width W of the weld bead should be less than 2.0 mm. Though it is preferable to increase the width of the laser bead 23 from the viewpoint of making the gradient of the surface of the weld bead small, there is an upper limit to the width from the viewpoint of extensibility. Since the welded sheet is pressed after laser welding, the weld sheet should have an extensibility substantially equal to that of a non-welded one piece sheet. In FIG. 10, the one-dotted chain line illustrates the relationship between an extensibility (%) and a weld bead width (mm) of a welded sheet and the full line illustrates the extensibility (%) of a non-welded sheet. As is seen from FIG. 10, the welded sheet has an extensibility substantially equal to that of a non-welded sheet if the width of the weld bead is equal to or less than 2.0 mm. Thus, the width of the weld bead should be equal to or less than 2.0 mm.

Figure 11:
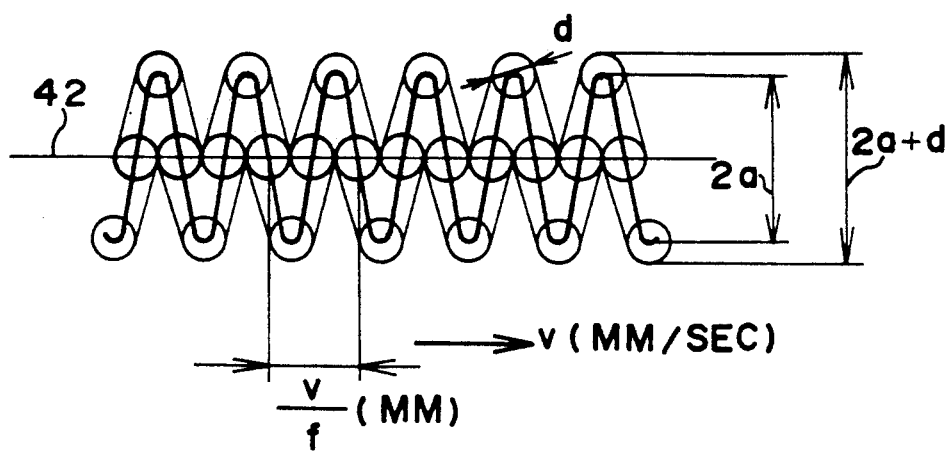
FIG. 11 is a schematic plan view of the surface of the welded assembly illustrating a relationship between the weaving line of the laser beam and the weld line.

Third, the amplitude of weaving of the laser beam 30 is selected to be equal to or greater than 0.25 mm. The width W of the weld bead 23 can be approximately calculated by the following equation, as shown in FIG. 11:

$$W = (2*a) + d$$

where,
a is an amplitude of weaving of the laser beam, and
d is a diameter of a heating spot of laser beam.
Since the minimum width is 1.0 mm and the diameter d is about 0.5 mm, a minimum amplitude of weaving of the laser beam is 0.25 mm.

Fourth, since the maximum width is 2.0 mm and the diameter d is about 0.5 mm, a maximum amplitude of weaving of the laser beam is 0.75 mm.

Fifth, the frequency f of weaving of the laser beam 30 should have the following relationship with respect to the speed v of the moved laser torch as shown in FIG. 6, so that the weld line 42 is continuously melted by the heating spot of the laser beam:

$$f \geq v / (2*d)$$

Sixth, there is an upper limit to the frequency of weaving of the laser beam to form a weld bead at the back surface of the thicker sheet. More particularly, as shown in FIG. 12, there is the relationship between an actual weaving speed v0 of the laser beam 30 and the torch speed v:

$$v0 = vx^2 + vy^2$$
$$= v^2 + a^2 w^2 \cos^2 wt$$
$$= v^2 + 4\pi f^2 a^2 \cos^2 wt$$

Figure 13:
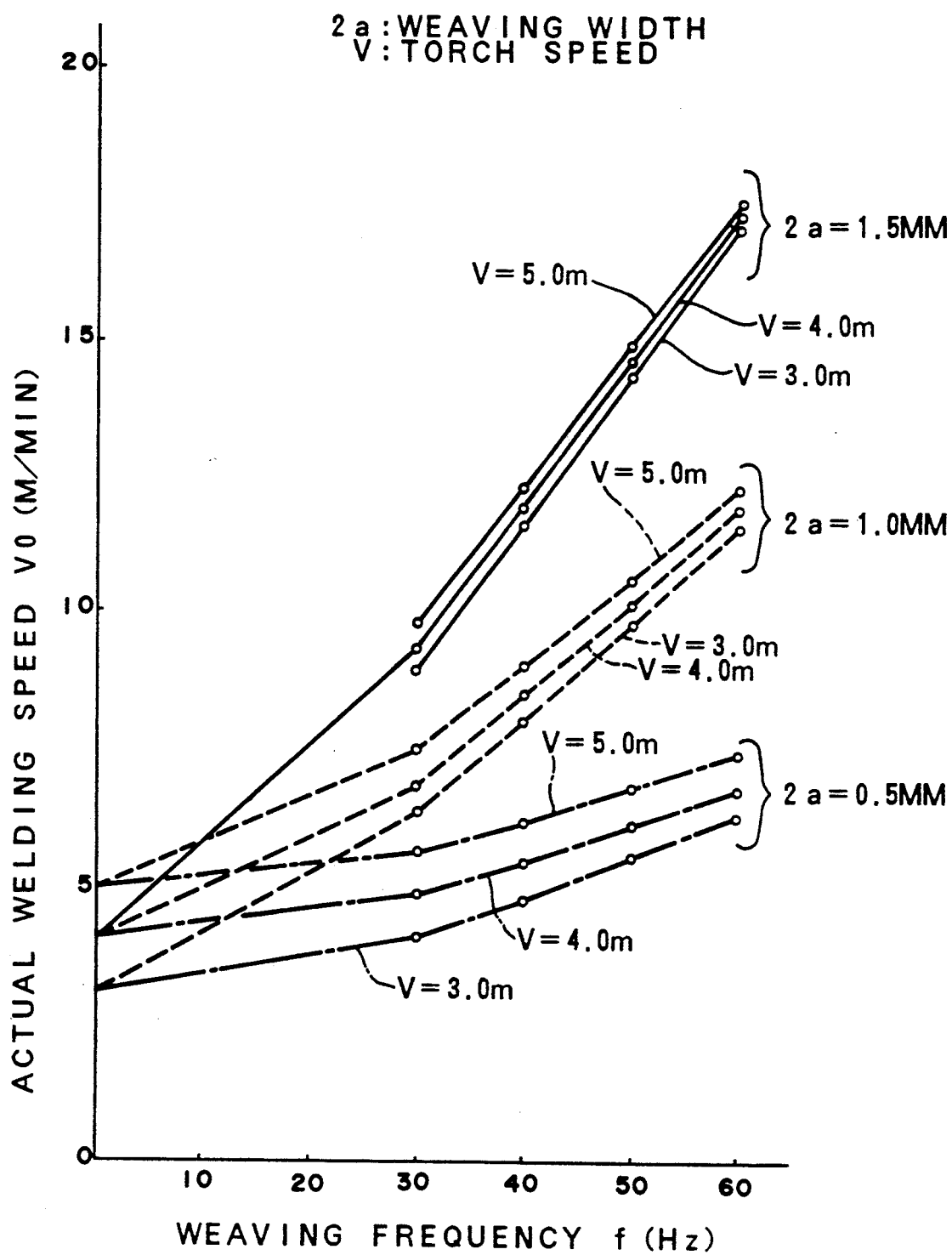
FIG. 13 is a graphical representation of actual weld speed versus weaving frequency characteristic.
Figure 14:
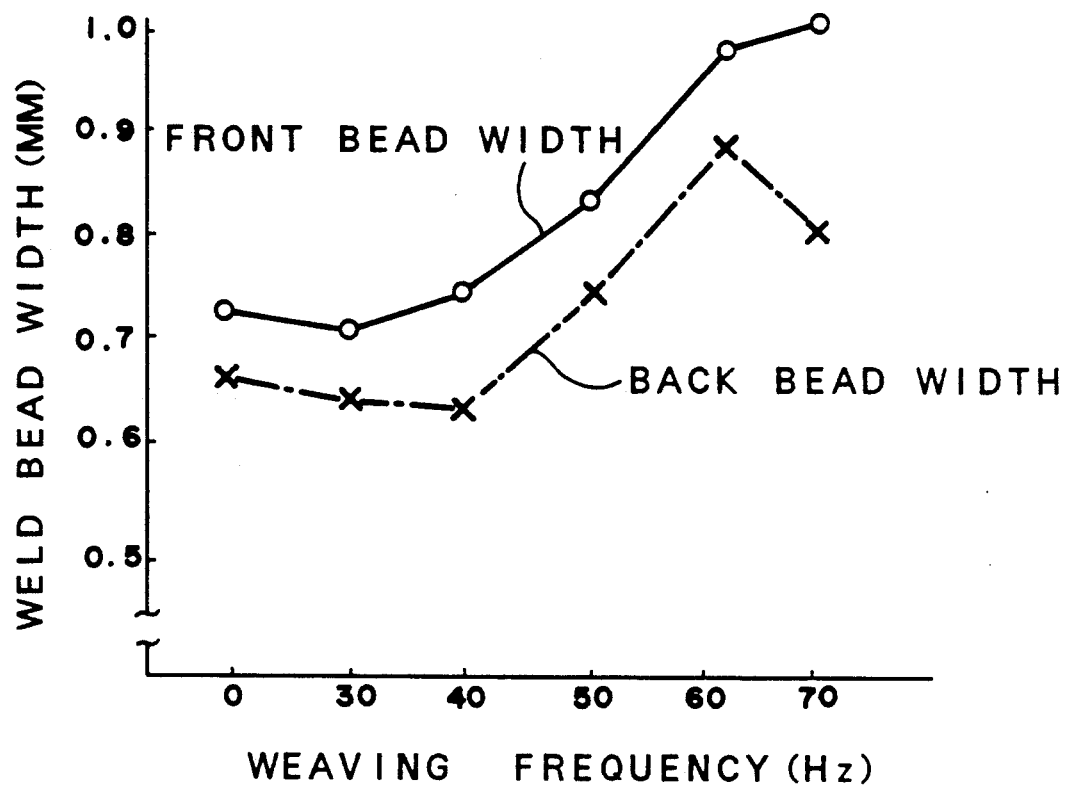
FIG. 14 is a graphical representation of weld bead width versus weaving frequency characteristic.
Figure 16:
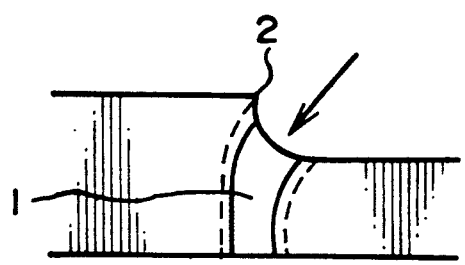
FIG. 16 is a cross-sectional view of laser weld bead between metal sheets having different thicknesses in accordance with a conventional method.

As will be understood from this equation, the higher the frequency of weaving of the laser beam, the higher the actual speed of the laser beam. In this instance, the torch speed v is constant. FIG. 13 illustrates the results of various tests where weaving widths (twice the amplitude of weaving) are changed. From FIG. 13, it is seen that the weaving frequency has a great effect on the actual speed of the laser beam. When the laser beam speed is great, the supplied energy per unit weld length at the welding line 42 is small and is insufficient to form a weld bead at the back surface of the thicker sheet. When the laser output is increased, the supplied energy is great and the width of the weld bead measured at the back surface of the sheet is great, as shown in FIG. 14. Therefore, when the laser beam speed is increased, the laser output should be increased. However, there is a limit to the laser output. As a result, when the frequency of weaving of the laser beam is increased to a certain value (for example, 70 Hz in FIG. 14) and the laser beam speed is thus increased, formation of a weld bead at the back surface of the thicker sheet suddenly deteriorates as shown in FIG. 14. Accordingly, the weaving frequency of the laser beam should be selected to be less than that certain value.

Figure 15:
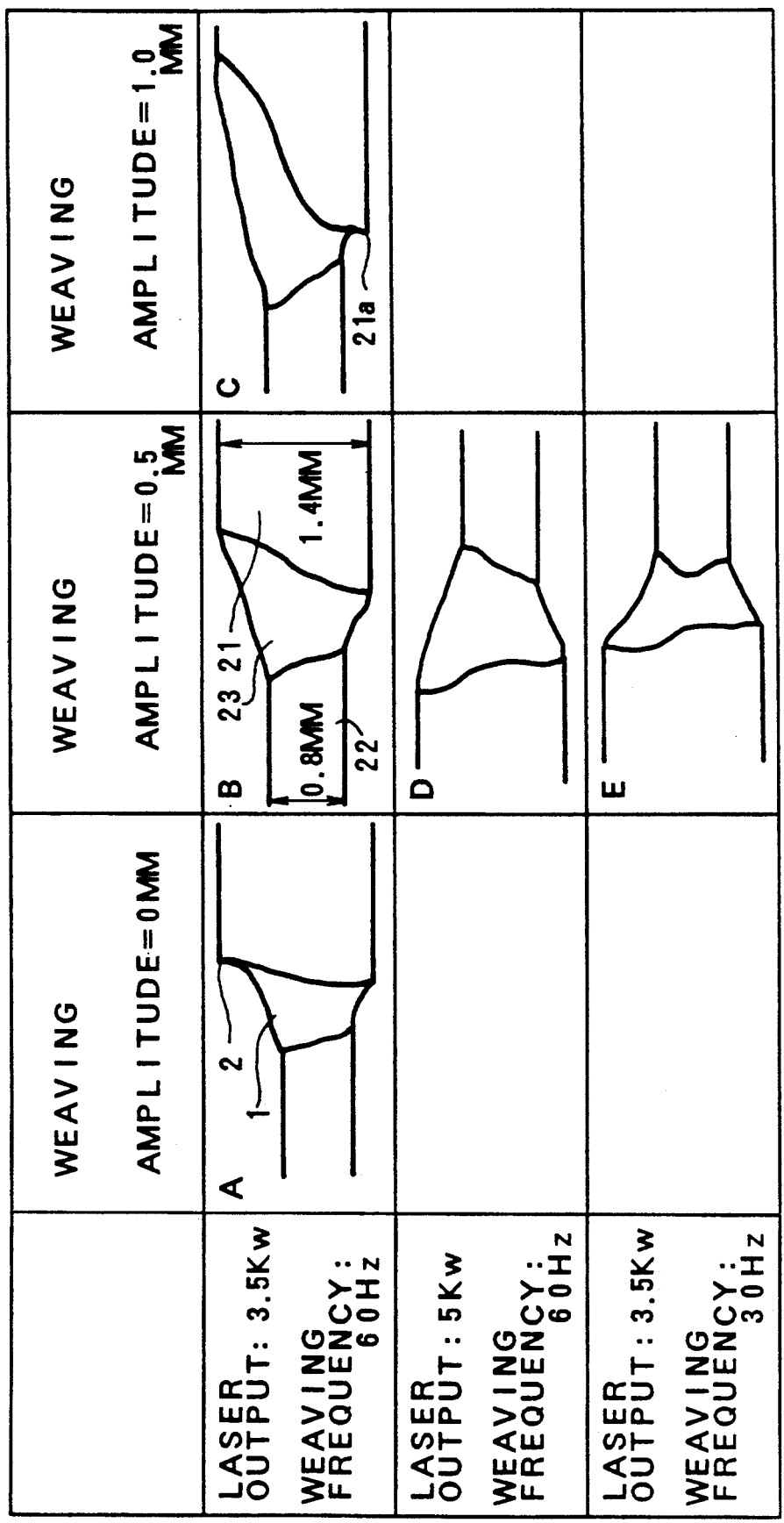
FIG. 15 is a table including Boxes A, B, C, D, and E which show cross sections of various weld beads.

FIG. 15 illustrates typical test results.

Boxes A, B, and C of FIG. 15 illustrate the results of tests in which the weaving amplitude was changed variously. In the tests, the thickness of one steel sheet was 1.4 mm and the thickness of the other steel sheet was 0.8 mm. The laser output was 3.5 KW and the frequency of weaving of the laser beam was 60 Hz.

Box (A) of FIG. 15 corresponds to the results of the conventional method as found in the prior art. In this case, the laser beam was not weaved and was directed along the abutment line instead of an offset, parallel welding line. As a result, a sharp edge remains at the surface of the thicker plate. Further, the width of the weld bead is about 1.0 mm and a steep gradient is formed at the weld bead surface.

Box (B) of FIG. 15 which corresponds to one case of the present invention, shows the result of the test where the amplitude of weaving of the laser beam was selected to be 0.5 mm. No edge remains at the weld bead surfaces.

Box (C) of FIG. 15 which is not included in the present invention, shows the result of the test where the amplitude of weaving of the laser beam was selected to be 1.0 mm. In that test, the actual weaving speed of the laser beam was too large to melt the back surface of the thicker sheet and a sharp edge 21a remained at the end of the back surface of the thicker sheet.

Boxes B, D, and E of FIG. 15 illustrate the results of tests where the frequency of weaving of the laser beam and the laser output were changed variously though the weaving amplitude was fixed to 0.5 mm. Each of Boxes B, D, and E is in accordance with the present invention. In the case of Box B of FIG. 15, the weaving frequency was selected to be 60 Hz and the laser output was selected to be 3.5 KW. In the case of Box D of FIG. 15, the weaving frequency was selected to be 60 Hz and the laser output was selected to be 5 KW. In the case of Box E of FIG. 15, the weaving frequency was selected to be 30 Hz and the laser output was selected to be 3.5 KW. In all of the Box B, D, and E cases, a sharp edge was removed from the welded portion.

In accordance with the present invention, since the weld line was apart from the abutment line on the thicker sheet side, a sharp edge can be effectively removed from the end corner of the thicker sheet and a smooth weld bead surface is obtained. Further, in the case where the laser beam weaves from side to side with respect to the weld line, the width of the laser bead is increased and weld bead surface can smoothly connect the surface of the thicker sheet to the surface of the thinner sheet. As a result, the welded sheets do not damage the press roll, even if the sheets are not grinded before being pressed.

Although only a few embodiments of the invention have been described in detail above, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. A method of laser-welding metal sheets together, each having different thicknesses, for one-piece stamping, comprising the steps of:
   clamping the metal sheets of different thicknesses so that the metal sheets abut each other at end surfaces thereof to define an abutment line;
   generating a laser beam with a laser welding apparatus;
   directing the laser beam toward a line parallel to the abutment line and apart from the abutment line on the thicker sheet side, the line apart from the abutment line defining a weld line; and
   during said step of directing, moving said laser beam along the weld line, thereby to form a weld bead which laser-welds the metal sheets together.

2. A method according to claim 1, wherein a distance between the weld line and the abutment line is in a range of 0.1 mm and 0.4 mm.

3. A method according to claim 1, wherein during said step of directing, an axis of the laser beam is directed perpendicularly to a surface of the thicker sheet.

4. A method according to claim 1, wherein thicknesses of each of the metal sheets is in the range of 0.7 mm to 2.3 mm.

5. A method according to claim 1, wherein during said step of moving the laser beam along the weld line, the laser beam is moved linearly along the weld line.

6. A method according to claim 1, wherein in said step of clamping the metal sheets, thickness centers of the metal sheets are aligned.

7. A method according to claim 1, wherein in said step of clamping the metal sheets, back surfaces of the metal sheets are placed in the same level.

8. A method according to claim 1, wherein during said step of moving the laser beam along the weld line, the laser beam is weaved from side to side with respect to the weld line.

9. A method according to claim 8, wherein during said step of weaving the laser beam, a condenser lens of the laser welding apparatus is reciprocated in a direction perpendicular to the weld line while a welding torch of the laser welding apparatus is linearly moved.

10. A method according to claim 8, wherein a width of the weld bead is equal to or greater than 1.0 mm.

11. A method according to claim 8, wherein a width of the weld bead is equal to or less than 2.0 mm.

12. A method according to claim 8, wherein an amplitude of weaving of the laser beam is equal to or greater than 0.25 mm.

13. A method according to claim 8, wherein an amplitude of weaving of the laser beam is equal to or less than 0.75 mm.

14. A method according to claim 8, wherein a frequency of weaving of the laser beam satisfies the following relationship:

$$f \geq v / (2*d)$$

where,
- f is a frequency of weaving of the laser beam,
- v is a moving speed of a welding torch measured in millimeters, and
- d is a diameter of a laser beam spot at a surface of a thicker of the two metal sheets measured in millimeters.

15. A method according to claim 8, wherein a frequency of weaving of the laser beam is less than a predetermined maximum frequency so that a weld bead can be formed at a back surface of a thicker of the two metal sheets.

* * * * *